United States Patent
Shestak et al.

(10) Patent No.: US 7,404,642 B2
(45) Date of Patent: Jul. 29, 2008

(54) AUTOSTEREOSCOPIC DISPLAY

(75) Inventors: Sergey Shestak, Suwon-si (KR); Dae-sik Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 175 days.

(21) Appl. No.: 11/259,084

(22) Filed: Oct. 27, 2005

(65) Prior Publication Data

US 2006/0114415 A1 Jun. 1, 2006

Related U.S. Application Data

(60) Provisional application No. 60/631,194, filed on Nov. 29, 2004.

(30) Foreign Application Priority Data

Apr. 4, 2005 (KR) .................. 10-2005-0028065

(51) Int. Cl.
*G03B 21/00* (2006.01)
*G02B 27/22* (2006.01)
*H04N 15/00* (2006.01)
*H04N 13/04* (2006.01)
*G02F 1/1335* (2006.01)

(52) U.S. Cl. ............... 353/7; 353/8; 353/10; 359/462; 359/478; 348/57; 348/58; 349/15

(58) Field of Classification Search ............ 353/7, 353/10, 8, 20; 359/462–467, 471, 472, 477, 359/478; 348/42, 51, 54, 55, 59, 57, 58; 349/15

See application file for complete search history.

(56) References Cited

U.S. PATENT DOCUMENTS 5,500,765 A 3/1996 Eichenlaub (Continued)

FOREIGN PATENT DOCUMENTS

CN 1506714 6/2004

(Continued)

OTHER PUBLICATIONS

European Search Report dated Mar. 21, 2007 issued in EP0511009.

(Continued)

*Primary Examiner*—Rochelle-Ann Blackman
(74) *Attorney, Agent, or Firm*—Stanzione & Kim, LLP

(57) ABSTRACT

An autostereoscopic display having an improved 2D/3D mode switchable structure, including a display device to display an image, and a parallax barrier unit to transmit all incident light in a 2D mode and to separate a left-eye image and a right-eye image by forming a barrier in a 3D mode. The parallax barrier unit includes a polarizer to transmit light having a predetermined polarizer polarization direction, a first plane array including first and second birefringent elements, which change a polarization direction of light transmitted through the polarizer into a first direction and a second direction opposite to the first direction, respectively, and a second plane array including third and fourth birefringent elements, which change a polarization direction of light transmitted through the first plane array into a third direction and a fourth direction, that is opposite from the third direction, respectively.

31 Claims, 12 Drawing Sheets

U.S. PATENT DOCUMENTS

| | | |
|---|---|---|
| 5,825,541 A | 10/1998 | Imai |
| 6,157,424 A | 12/2000 | Eichenlaub |
| 6,195,205 B1 | 2/2001 | Faris |
| 6,437,915 B2 | 8/2002 | Moseley et al. |
| 2002/0118452 A1 | 8/2002 | Taniguchi et al. |
| 2004/0012851 A1* | 1/2004 | Sato et al. ................... 359/464 |
| 2004/0109115 A1 | 6/2004 | Tsai et al. |

FOREIGN PATENT DOCUMENTS

| | | |
|---|---|---|
| EP | 1396749 | 3/2004 |
| EP | 1406163 | 4/2004 |
| JP | 2002-156603 | 5/2002 |
| JP | 2003-330107 | 11/2003 |
| JP | 2003-337390 | 11/2003 |
| KR | 2002-0041382 | 6/2002 |
| KR | 2004-0058843 | 7/2004 |

OTHER PUBLICATIONS

Chinese Office Action dated Mar. 30, 2007 issued in CN 2005101242672.

* cited by examiner

AUTOSTEREOSCOPIC DISPLAY

CROSS-REFERENCE TO RELATED APPLICATIONS

This application claims the benefit of U.S. Provisional Patent Application No. 60/631,194, filed on Nov. 29, 2004, in the U.S. Patent & Trademark Office and Korean Patent Application No. 10-2005-0028065, filed on Apr. 4, 2005, in the Korean Intellectual Property Office, the disclosures of which are incorporated herein in their entirety by reference.

BACKGROUND OF THE INVENTION

1. Field of the Invention

The present general inventive concept relates to an autostereoscopic display that is switchable between three dimensional (3D) and two dimensional (2D) modes of operation, and more particularly, to an improved 2D/3D switchable autostereoscopic display.

2. Description of the Related Art

In general, autostereoscopic displays are used in game machines, computer monitors, notebook displays, mobile phones, and other applications to produce stereoscopic images.

Autostereoscopic displays are typically mechanically switched between a two dimensional (2D) mode and a three dimensional (3D) mode to selectively provide a 2D image or a 3D image according to an image signal. Various types of switchable autostereoscopic displays have been developed.

For example, U.S. Pat. No. 5,500,765, entitled "convertible 2D/3D autostereoscopic display" and invented by Eichenlaub, discloses a conventional 2D/3D switchable autostereoscopic display using a lenticular parallax element, wherein switching from the 3D mode to the 2D mode is achieved by attaching a complementary lenticular sheet having a negative refractive power to the lenticular parallax element, which has a positive refractive power. The attached complementary lenticular sheet compensates optical power of the lenticular parallax element, such that a 2D image can be seen with full resolution on an image panel. To provide the 2D/3D switching, the conventional display has the screen sized complementary lenticular sheet mounted on hinges, which allows for the complementary lenticular sheet to be attached and detached by rotation. Accordingly, the conventional display is complex in structure and the complementary lenticular sheet, which is rotated on the hinges, requires a large amount of free space within and around the conventional display, thereby increasing an overall size of the conventional display.

U.S. Pat. No. 6,437,915, entitled "parallax barrier, display, passive polarization modulating optical element, and method of making such an element" and invented by Moseley et al., discloses another conventional 2D/3D switchable display based on a latent parallax barrier, which is activated by attaching a polarizer sheet on a display screen.

FIG. 1 is a perspective view of a conventional on-off switchable parallax barrier that uses a removable polarization sheet as disclosed in U.S. Pat. No. 6,437,915. Referring to FIG. 1, the conventional parallax barrier of the display includes a polarization modifying layer 10, and a polarizer in the form of a polarization sheet 11. The polarization modifying layer 10 includes aperture regions 12 in the form of parallel elongated slit regions arranged to rotate a linear polarization of incoming light 13 by 90 degrees. The aperture regions 12 are separated by barrier regions 14, which are arranged so as not to affect the polarization of the incoming light 13.

When the conventional parallax barrier is disposed in front of a liquid crystal display (LCD) of a thin film transistor (TFT) type, light output from the LCD is polarized in a direction indicated by arrow A.

The polarization sheet 11 has a polarization direction indicated by arrow B, which is perpendicular to a polarization direction A of incident light. However, the polarization direction B is parallel to the polarization direction of light passing through the aperture regions 12 such that the conventional parallax barrier operates in a barrier mode and incident light is transmitted through the aperture regions 12 while being substantially blocked or extinguished at parts of the conventional parallax barrier defined by the barrier regions 14. In order to operate the conventional parallax barrier in a non-barrier mode, the polarization sheet 11 is disabled, for instance, by being removed. In the non barrier-mode, the aperture regions 12 are substantially invisible because they are not analyzed by the polarization sheet 11.

FIGS. 2A through 2C illustrate conventional arrangements of a polarization sheet and the conventional parallax barrier.

Referring to FIG. 2A, a polarization sheet 21 is attached to a stereoscopic display 20 by double hinges 25. This allows the polarization sheet 21 to be rotated over a front of the display 20. In this case, a space for moving the polarization sheet 21 mounted on the hinges 25 becomes necessary, thereby leading to a bulky and complex structure.

Referring to FIG. 2B, a polarization sheet is formed on a transparent film 27 having a longitudinal region which is transparent and non-polarizing. The transparent film 27 is wound on rollers 29 that are disposed on either side of an LCD and a polarization modifying layer. The rollers 29 are driven for instance by an electric motor, so that a polarizing region of the polarization sheet or the transparent non-polarizing region of the film 27 may be disposed in front of the LCD.

When the transparent film 27 is wound on the rollers 29, the rollers 29 and the electric motor for driving the rollers 29 should be disposed on a body of the conventional display. Consequently, the conventional display is complex and is difficult to use.

FIG. 2C illustrates another arrangement to switch between the 3D and 2D modes of operation. Referring to FIG. 2C, a polarization sheet is installed in front of an LCD and a layer is disposed to be rotatable about an axis perpendicular to the polarization sheet.

The conventional display disclosed in U.S. Pat. No. 6,437,915 can switch between the 2D and 3D modes by rotating or rolling the polarization sheet 11. However, in this case, the overall size of the conventional display is significantly larger than a size of the display screen. Rotation of the polarization sheet 11 also requires a large space around the display screen and does not provide complete invisibility of the conventional parallax barrier structure.

SUMMARY OF THE INVENTION

The present general inventive concept provides a 2D/3D switchable autostereoscopic display, which can switch between a 3D mode and a 2D mode with full resolution using minimal movement of plane arrays in a narrow space.

The foregoing and/or other aspects of the present general inventive concept may be achieved by providing an autostereoscopic display, comprising a display device to display an image, and a parallax barrier unit to transmit all incident light in a 2D mode and to separate a left-eye image and a right-eye image by forming a barrier in a 3D mode. The parallax barrier unit comprises a polarizer disposed in an optical path of the image displayed by the display device to transmit light having a predetermined polarizer polarization direction, a first plane array including first birefringent elements, which change a polarization direction of light transmitted through the polarizer into a first direction, and second birefringent elements, which change the polarization direction of the light transmitted through the polarizer into a second direction opposite to the first direction, the first and second birefringent elements alternating with each other, a second plane array facing the first plane array and including third birefringent elements, which change the polarization direction of light transmitted through the first plane array into a third direction, and fourth birefringent elements, which change the polarization direction of the light transmitted through the first plane array into a fourth direction opposite to the third direction, the third and fourth birefringent elements alternating with each other, and an analyzer facing the second plane array to transmit only light having a predetermined analyzer polarization direction from among light transmitted through the second plane array, wherein at least one of the first and second plane arrays is movable to control relative positions of the first and second birefringent elements and the third and fourth birefringent elements to selectively display a 2D image or a 3D image.

The foregoing and/or other aspects of the present general inventive concept may also be achieved by providing an autostereoscopic display, comprising a first plane array to receive incident light of an image and having a plurality of first and second birefringent elements to change a polarization of the incident light in first and second directions, a second plane array disposed adjacent to the first plane array to receive incident light from the first plane array and having a plurality of third and fourth birefringent elements to change a polarization of the incident light in the first and second directions, an analyzer to receive incident light from the second plane array and to transmit incident light of a predetermined polarization, and a switch to shift a relative position of the first and second plane arrays such that a first portion of the incident light of the image is blocked by the analyzer while a second portion of the incident light of the image is transmitted by the analyzer when the autostereoscopic display operates in a 3D mode.

The foregoing and/or other aspects of the present general inventive concept may also be achieved by providing an autostereoscopic display, comprising a first birefringent array and a second birefringent array disposed to face the first birefringent array, and a relative positioning unit to displace one of the first and second birefringent arrays along a displacement axis that is parallel to both the first and second birefringent arrays.

The foregoing and/or other aspects of the present general inventive concept may also be achieved by providing a parallax barrier unit usable with an autostereoscopic display, the unit comprising an analyzer to transmit incident light having a predetermined analyzer polarization, and at least one birefringent element to receive incident light, to transform a polarization of the incident light to one of the predetermined analyzer polarization, and a predetermined blocked polarization, and to provide the light having the transformed polarization to the analyzer.

The foregoing and/or other aspects of the present general inventive concept may also be achieved by providing a 2D/3D switch usable with an autostereoscopic display, the switch comprising a first birefringent array and a second birefringent array disposed to face the first birefringent array, and a relative positioning unit to displace one of the first and second birefringent arrays along a displacement axis that is parallel to both the first and second birefringent arrays.

The foregoing and/or other aspects of the present general inventive concept may also be achieved by providing a method of switching between a 3D mode and a 2D mode in an autostereoscopic display, the method comprising receiving polarized light of an image, and controlling a relative positioning of two birefringent arrays such that all the received light passes through the two birefringent arrays to have a polarization transformed to a predetermined output polarization in a first operational mode, and a first portion of all the received light passes through the two birefringent arrays to have a polarization transformed to a predetermined blocked polarization and a second portion of all the received light passes through the two birefringent arrays to have a polarization transformed to the predetermined output polarization in a second operational mode.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
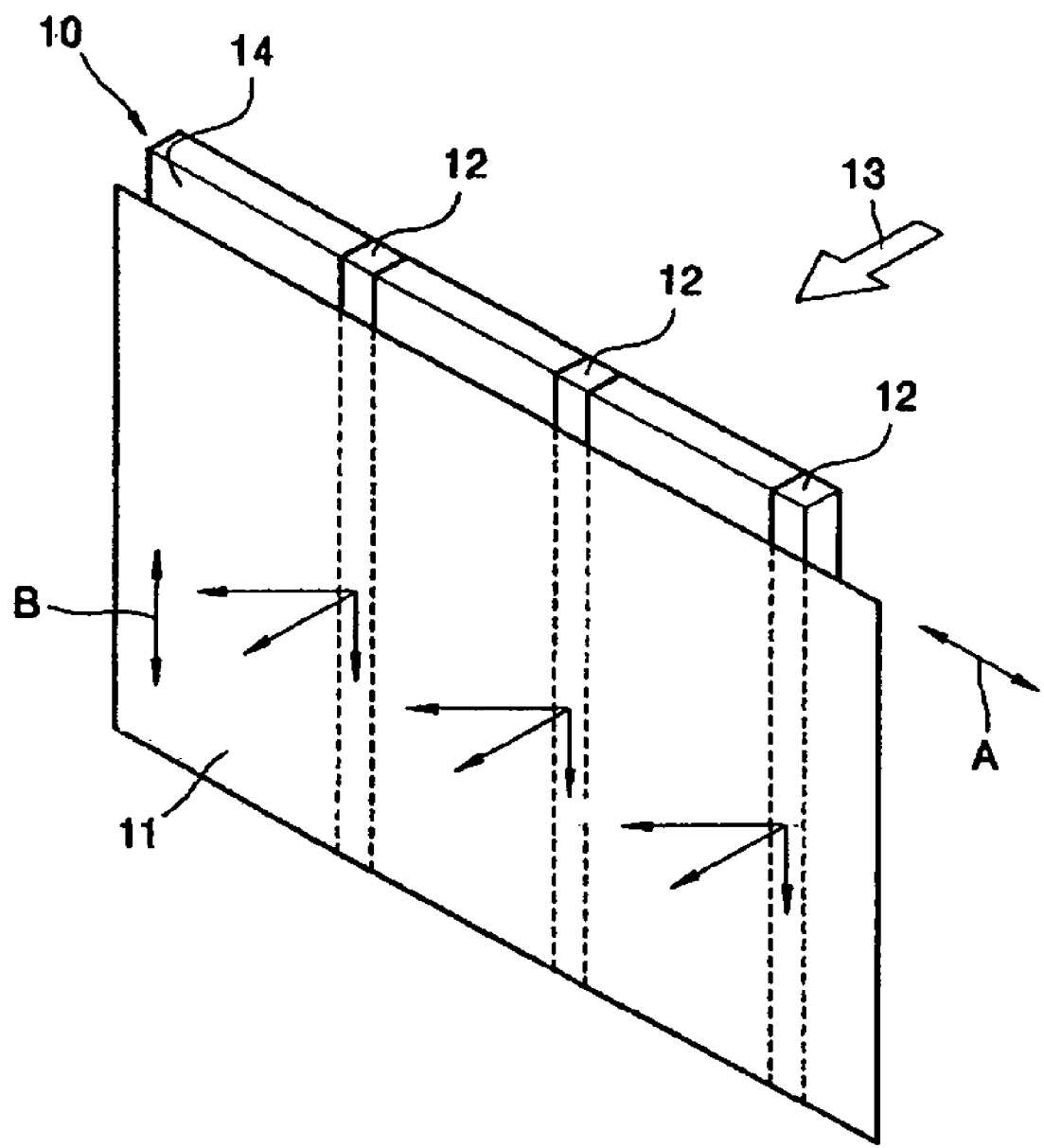
FIG. 1 is a perspective view illustrating a conventional on-off switchable parallax barrier that uses a removable polarization sheet.
Figure 2A:
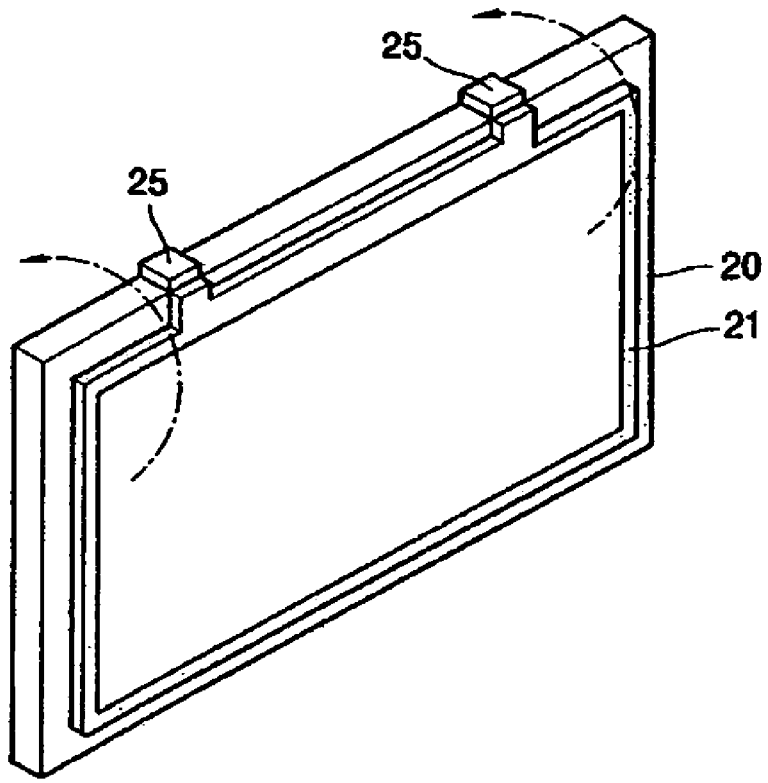
FIGS. 2A through 2C illustrate a variety of mechanical designs for the conventional on-off switchable parallax barrier.
Figure 2B:
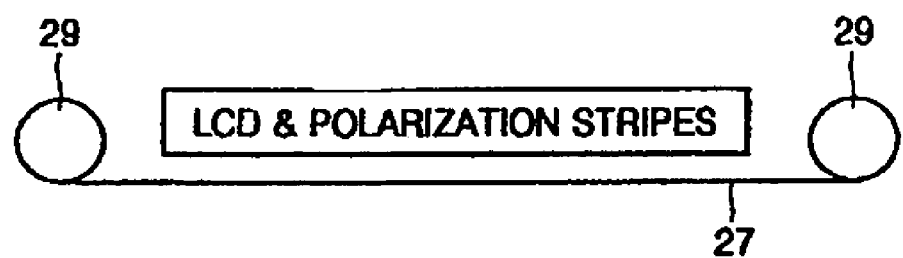
Figure 2C:
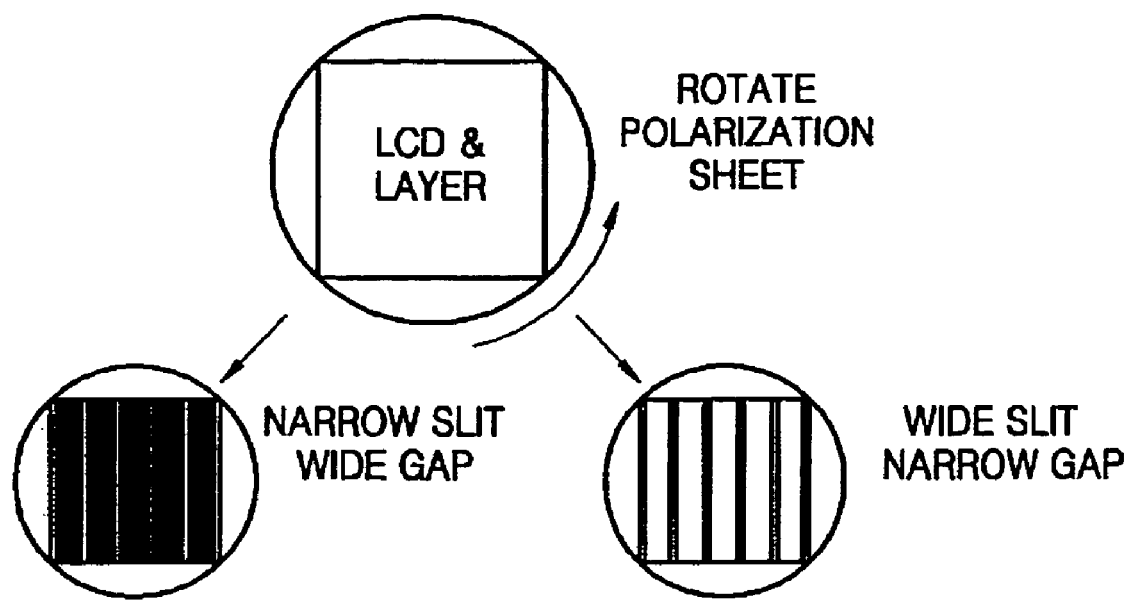

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Figure 3A:
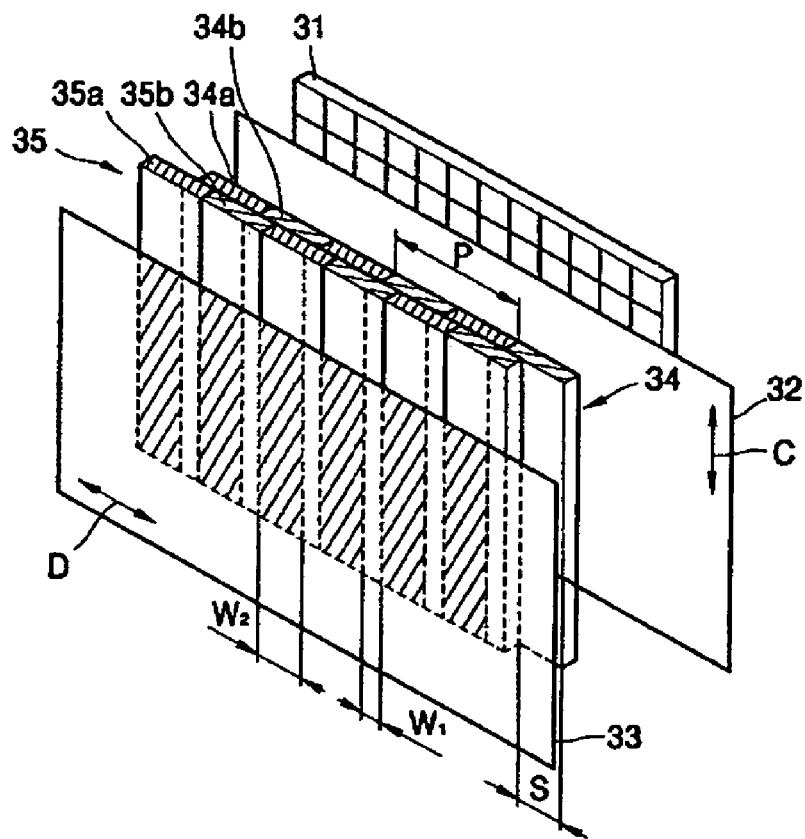
FIGS. 3A through 3F are perspective views illustrating an autostereoscopic display according to an embodiment of the present general inventive concept, FIGS. 3A and 3B illustrating the autostereoscopic display respectively in a three dimensional (3D) mode and a two dimensional (2D) mode, FIGS. 3C and 3D illustrating an array of rotators respectively in the 3D mode and the 2D mode, FIGS. 3E and 3F illustrating an array of retarders respectively in the 3D mode and the 2D mode.
Figure 3B:
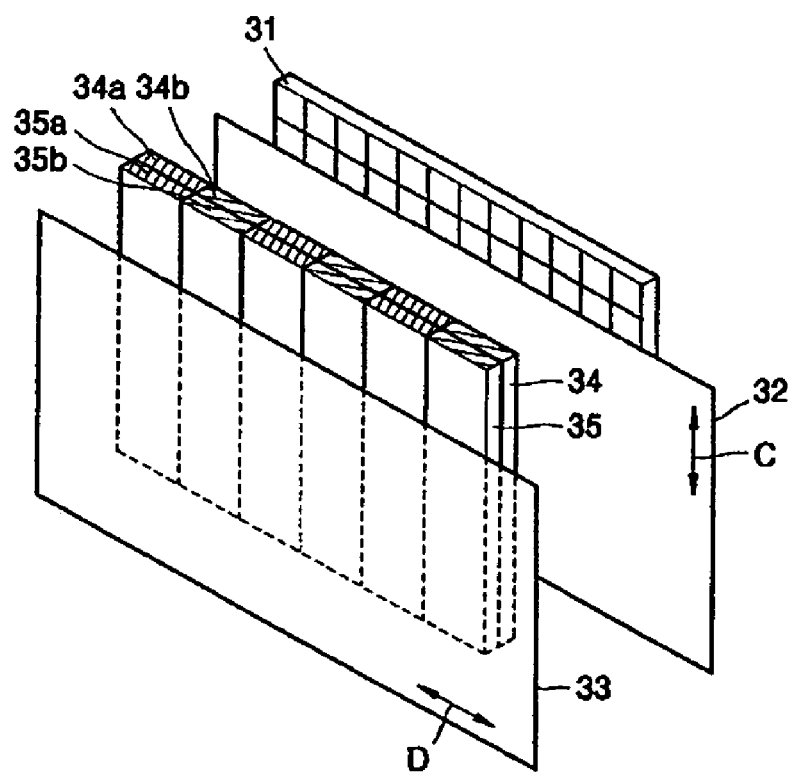
Figure 3C:
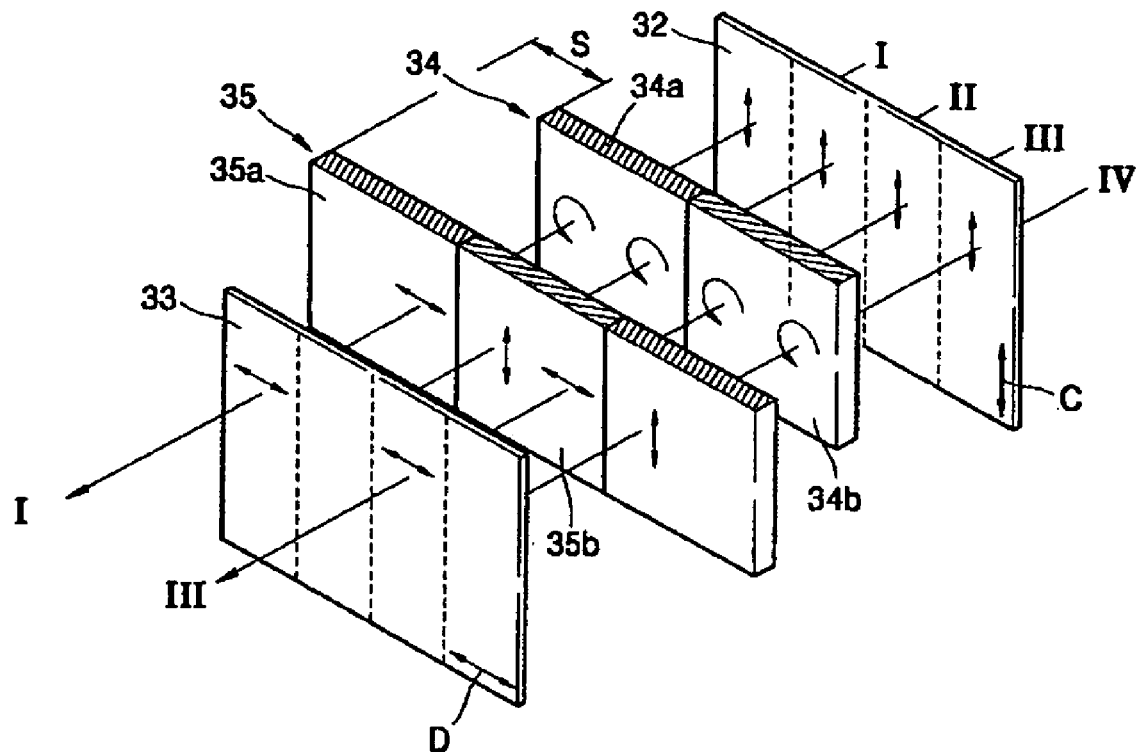
Figure 3D:
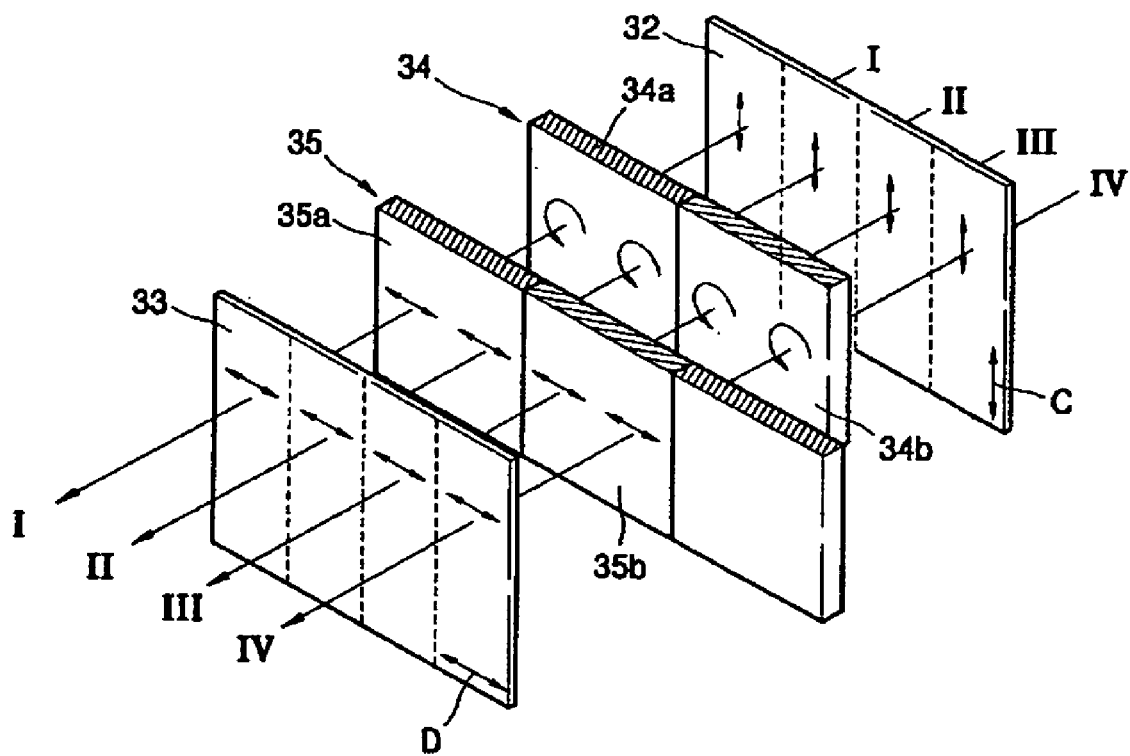
Figure 3E:
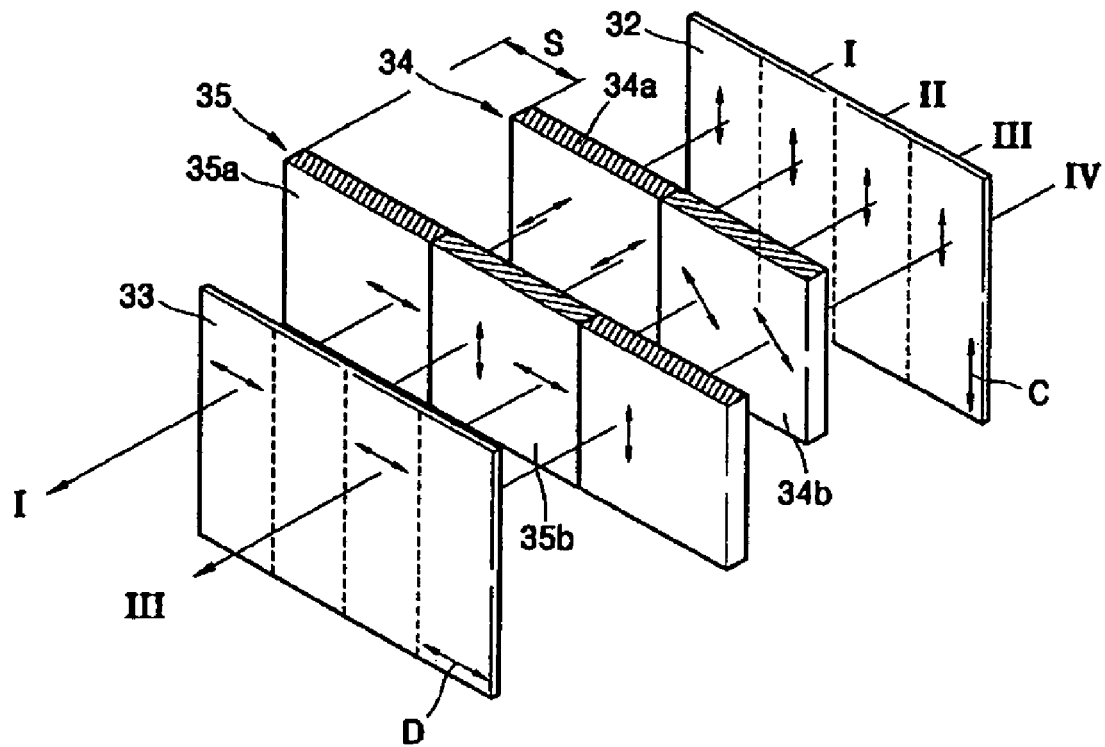
Figure 3F:
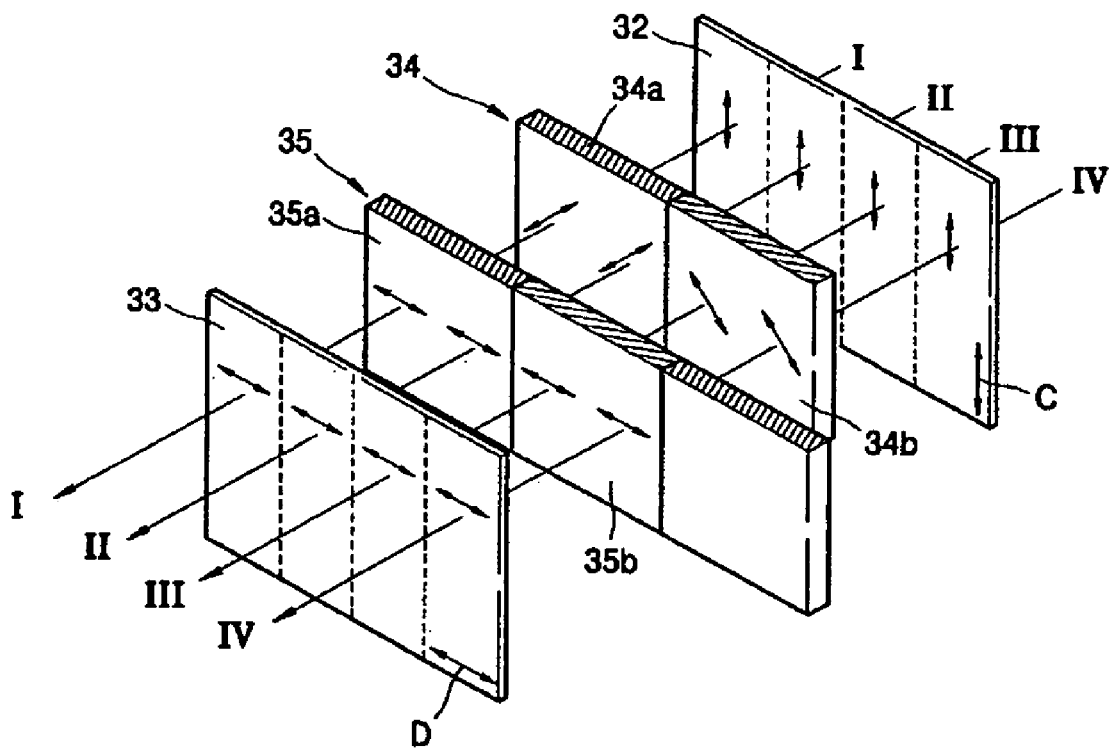

FIGS. 3A through 3F are perspective views illustrating an autostereoscopic display according to an embodiment of the present general inventive concept. Specifically, FIGS. 3A and 3B illustrate the autostereoscopic display respectively in a three dimensional (3D) mode and a two dimensional (2D) mode. FIGS. 3C and 3D illustrate an array of rotators respectively in the 3D mode and the 2D mode. FIGS. 3E and 3F illustrate an array of retarders respectively in the 3D mode and the 2D mode.

Referring to FIG. 3A, the autostereoscopic display includes a display device 31 to display an image including pixels in a row and column array, and a parallax barrier unit to transmit all incident light in the 2D mode and to separate a left-eye image and a right-eye image by forming a barrier in the 3D mode.

The parallax barrier unit includes a polarizer 32, an analyzer 33, and first and second plane arrays 34 and 35 disposed between the polarizer 32 and the analyzer 33. At least one of the first and second plane arrays 34 and 35 is movable, such that a 2D image or a 3D image can be selectively displayed by relatively moving the first and second plane arrays 34 and 35.

The polarizer 32 is disposed in an optical path of the image displayed by the display device 31, and transmits light having a predetermined polarization direction C. Accordingly, when non-polarized light is incident on the polarizer 32, the polarizer 32 transmits only light having the polarization direction C such that the light can be linearly polarized light.

Each of the first and second plane arrays 34 and 35 may include birefringent elements which may be rotators or retarders. That is, the first plane array 34 includes a plurality of first and second birefringent elements 34a and 34b each having a stripe shape with a predetermined width, and the first and second birefringent elements 34a and 34b alternate with each other. When the first and second birefringent elements 34a and 34b are rotators (i.e., circular birefringent elements), the first and second birefringent elements 34a and 34b rotate incident light by $+(2n+1)\times 45°$ and $-(2n+1)\times 45°$, respectively.

On the other hand, when the first and second birefringent elements 34a and 34b are retarders (i.e., linear birefringent elements), the first and second birefringent elements 34a and 34b phase-shift the incident light by $+(2n+1)\lambda/4$ and $-(2n+1)\lambda/4$, respectively. Here, $\lambda$ denotes a wavelength of the incident light and $n=0, 1, 2, 3, \ldots$ When $n=0$, the rotators may rotate the incident light by $+45°$ and the retarders may phase-shift the incident light by $\lambda/4$. In this case, the rotators or the retarders can keep their properties in a wide spectral range and show a strong tolerance with respect to an angle of incidence.

The second plane array 35 includes third and fourth birefringent elements 35a and 35b each having a stripe shape with a predetermined width, and the third and fourth birefringent elements 35a and 35b alternate with each other. Each of the third and fourth birefringent elements 35a and 35b may be rotators (i.e., circular birefringent elements), or retarders (i.e., linear birefringent elements), similar to the first and second birefringent elements 34a and 34b.

The 2D mode or the 3D mode can be selected by relatively moving the first and second plane arrays 34 and 35. For example, a position of the first plane array 34 may be fixed while the second plane array 35 may be movable horizontally so that a position of the second plane array 35 can be switched between a first position illustrated in FIG. 3A and a second position illustrated in FIG. 3B. In the first position, boundaries between the first and second birefringent elements 34a and 34b of the first plane array 34 are misaligned with corresponding boundaries between the third and fourth birefringent elements 35a and 35b of the second plane array 35 to form a parallax barrier due to an operation principle described below, thereby permitting operation in the 3D mode.

In the second position, however, the boundaries between the first and second birefringent elements 34a and 34b of the first plane array 34 are aligned with the boundaries between the third and fourth birefringent elements 35a and 35b of the second plane array 35 to transmit all images displayed by the display device 31, thereby permitting operation in the 2D mode.

Each of the first through fourth birefringent elements 34a, 34b, 35a, and 35b of the first and second plane arrays 34 and 35 may have a stripe shape extending along a first direction that is parallel to the polarization direction C of the polarizer 32. The first and second plane arrays 34 and 35 may be relatively shifted in a direction slanted at a first inclination angle $\Phi$ (see FIG. 9B) with respect to the first direction in which the first, second, third, and fourth birefringent elements 34a, 34b, 35a, and 35b are arranged, so that when modes are switched manually, an effective displacement of the second plane array 35 relative to the first plane array 34 can be shorter than an effective displacement of a mode switch when the second plane array 35 is shifted as illustrated in FIG. 3A.

It should be understood that the birefringent elements of the first and second plane arrays 34 and 35 are not intended to be limited to those arrangements illustrated in FIGS. 3A and 3B and described above, and may have other alternative arrangements. For example, the birefringent elements of the first and second plane arrays 34 and 35 may have various arrangements illustrated in FIGS. 4A and 4B.

Figure 4A:
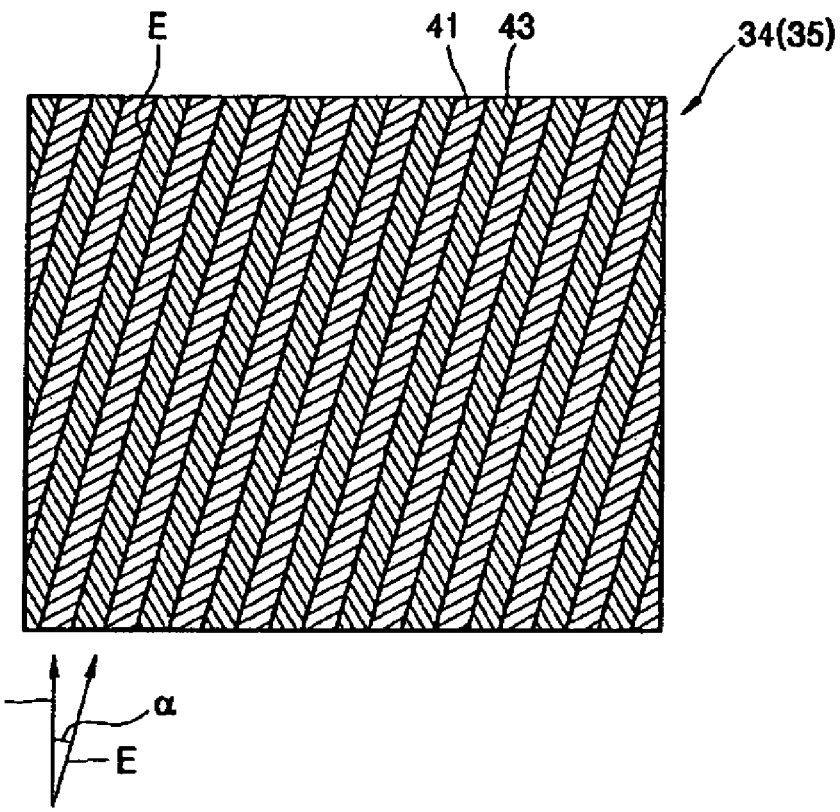
FIGS. 4A and 4B illustrate birefringent elements of first and second plane arrays of the autostereoscopic display of FIGS. 3A through 3F according to various embodiments of the present general inventive concept.

Referring to FIG. 4A, birefringent elements 41 and 43 of the first and second plane arrays 34 and 35 have stripe shapes characterized by opposite polarization directions or opposite retardation directions, and the birefringent elements 41 and 43 extend along a second direction E that is slanted at a second inclination angle "$\alpha$" with respect to the polarization direction C of the polarizer 32. In this case, the first and second plane arrays 34 and 35 are relatively shifted in a third direction that is slanted at a third inclination angle (not shown), which is different from the second inclination angle "$\alpha$", with respect to the polarization direction C of the polarizer 32.

Figure 4B:
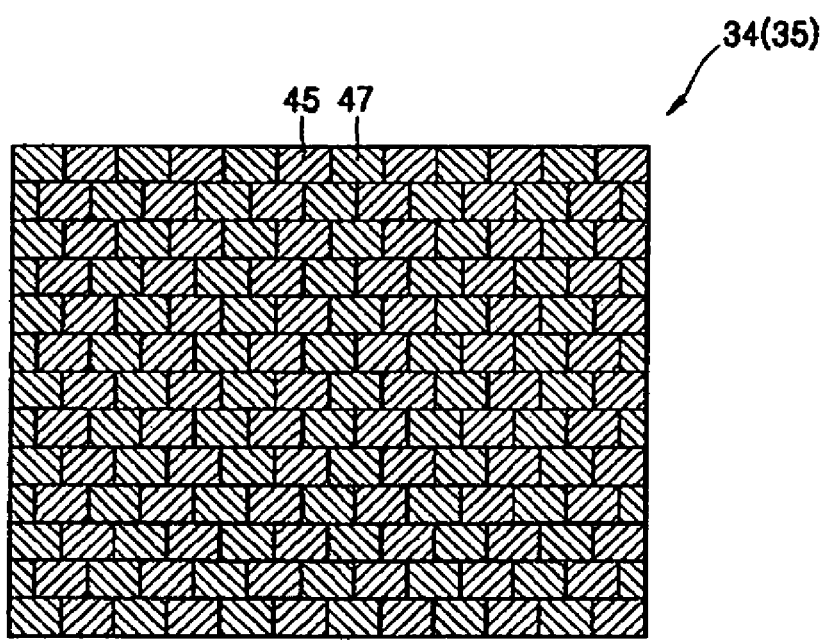

Referring to FIG. 4B, the first and second plane arrays 34 and 35 are arranged in a stepwise manner and include two dimensional birefringent elements 45 and 47.

In the first and second plane arrays 34 and 35 illustrated in FIGS. 4A and 4B, when polarization rotators are used as the birefringent elements, the birefringent elements 41 and 45 rotate a polarization direction of the incident light by $+(2n+1)\times 45°$, and the adjacent birefringent elements 43 and 47 rotate the polarization direction of the incident light by $-(2n+1)\times 45°$, where $n=0, 1, 2, 3 \ldots$ When polarization retarders are used as the birefringent elements, the birefringent elements 41 and 45 phase-shift the incident light by $+(2n+1)\lambda/4$, and the adjacent birefringent elements 43 and 47 phase-shift the incident light by $-(2n+1)\lambda/4$, where $\lambda$ denotes a wavelength of the incident light and $n=0, 1, 2, 3, \ldots$.

The analyzer 33 faces the second plane array 35 and transmits only light having a predetermined polarization from among light transmitted through the second plane array 35.

Polarization directions of the polarizer 32 and the analyzer 33 may be either parallel or perpendicular to each other. Referring to FIGS. 3A through 3F, the polarization directions of the polarizer 32 and the analyzer 33 are perpendicular to each other. That is, the polarization direction C of the polarizer 32 is parallel to a vertical direction of the display device 31, and a polarization direction indicated by arrow D of the analyzer 33 is parallel to a horizontal direction of the display device 31.

Operation of the autostereoscopic display according to the present embodiment will now be explained in detail with reference to FIGS. 3A through 3F.

Referring to FIGS. 3A through 3D, the first and third birefringent elements 34a and 35a are +45° rotators, and the second and fourth birefringent elements 34b and 35b are −45° rotators. In particular, FIGS. 3A and 3C illustrate the first and second plane arrays 34 and 35 in the 3D mode, and FIGS. 3B and 3D illustrate the first and second plane arrays 34 and 35 in the 2D mode.

Referring to FIGS. 3A and 3C, light emitted from the display device 31 is polarized in the vertical direction C by the polarizer 32. Part I of the light polarized in the vertical direction C is transmitted through the first birefringent elements 34a of the first plane array 34 such that a polarization direction of the part I of the vertically polarized light is rotated by +45°. Subsequently, the part I of the light is then transmitted through the third birefringent elements 35a of the second plane array 35, such that the polarization direction of the part I of the light is rotated further by +45°. As a result, the polarization direction of the part I of the vertically polarized light is rotated by 90° making the part I of the light visible through the analyzer 33. Part II of the vertically polarized light is transmitted through the first birefringent elements 34a of the first plane array 34 and the fourth birefringent elements 35b of the second plane array 35. Part IV of the vertically polarized light is transmitted through the second birefringent elements 34b of the first plane array 34 and the third birefringent elements 35a of the second plane array 35. Accordingly, since the polarization direction of the part 11 of the light is rotated by +45° by the first birefringent elements 34a and −45° by the fourth birefringent elements 35b and the polarization direction of the part IV of the light is rotated by −45° by the second birefringent elements 34b and +45° the third birefringent elements 35a, the polarization of the parts II and IV of the light are offset and thus the parts II and IV of the light reach the analyzer 33 without any change in the polarization. Hence, in the 3D mode, since the parts II and IV of the light have polarization directions that are perpendicular to the polarization direction D of the analyzer 33, the parts II and IV are blocked from being transmitted through the analyzer 33 in the 3D mode.

Part III of the vertically polarized light is transmitted through the second birefringent elements 34b of the first plane array 34, such that a polarization direction of the vertically polarized light III is rotated by −45°. Subsequently, the part III of the light is transmitted through the fourth birefringent elements 35b of the second plane array 35, such that the polarization direction of the part III of the light is further rotated by −45°. As a result, the polarization direction of the part III of the light is rotated by −90°. Since the polarization direction of the part III of the light is the same as the polarization direction D of the analyzer 33, the part III of the light can be transmitted through the analyzer 33 in the 3D mode.

As described above, by shifting the first and second plane arrays 34 and 35 by a distance S of FIGS. 3A, 3C, and 3E, incident light is transmitted through portions W1, and is blocked from transmission through portions W2. Accordingly, the portions W2 may function as a parallax barrier. The portions W2 may have a width equal to half of a pitch P of the birefringent arrays. Lengths of the portions W1 and W2 can be controlled according to the distance S between the first plane array 34 and the second plane array 35, and can be determined by considering a loss of light and crosstalk between left-eye images and right-eye images.

Since the basic principle and calculation of the parallax barrier should be known by one of ordinary skill in the art as disclosed in "Theory of Parallax Barriers" of S. H. Kaplan, disclosed in Journal of the SMPTE, Vol. 59, pp 11-21 (1952), a detailed explanation thereof will not be provided.

Referring to FIGS. 3B and 3D, the first and second plane arrays 34 and 35 are aligned with each other to realize a full resolution 2D mode. Hence, light emitted from the display device 31 is polarized by the polarizer 32 and is then transmitted through the first and second plane arrays 34 and 35 to be rotated by +90° or −90°, such that a polarization direction of the light is made the same as the polarization direction D of the analyzer 33. As a result, all light incident on the analyzer 33 is transmitted through the analyzer 33.

The first plane array 34 and the second plane array 35 may be relatively shifted either manually or with an electromechanical or piezoelectric actuator. The manual operation may be performed by a user, which is described below. Other methods/structures may also be used to shift the first and/or second plane arrays 34 and 35.

Referring to FIGS. 3E and 3F, the first and third birefringent elements 34a and 35a are +λ/4 retarders, and the second and fourth birefringent elements 34b and 35b are −λ/4 retarders.

In particular, FIG. 3E illustrates the first and second plane arrays 34 and 35 in the 3D mode, and FIG. 3F illustrates the first and second plane arrays 34 and 35 in the 2D mode. The first and second plane arrays 34 and 35 are relatively shifted in the same manner as described above with respect to FIGS. 3C and 3D to realize a 3D image or a full resolution 2D image by selectively forming a parallax barrier.

Figure 5A:
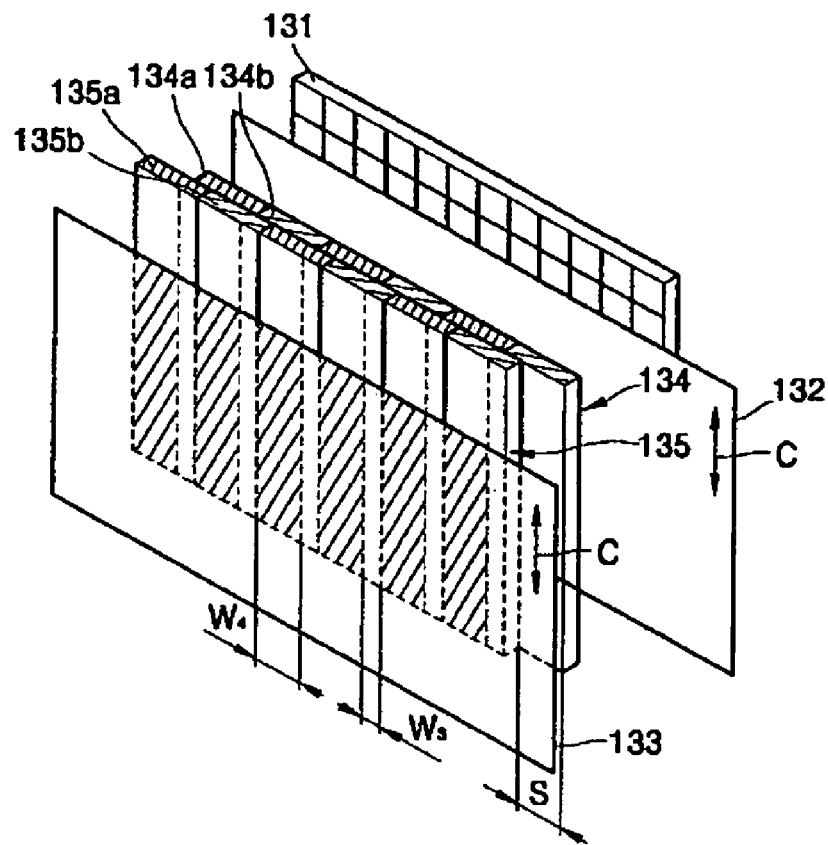
FIGS. 5A and 5B are perspective views illustrating an autostereoscopic display, respectively in the 3D mode and the 2D mode according to another embodiment of the present general inventive concept.
Figure 5B:
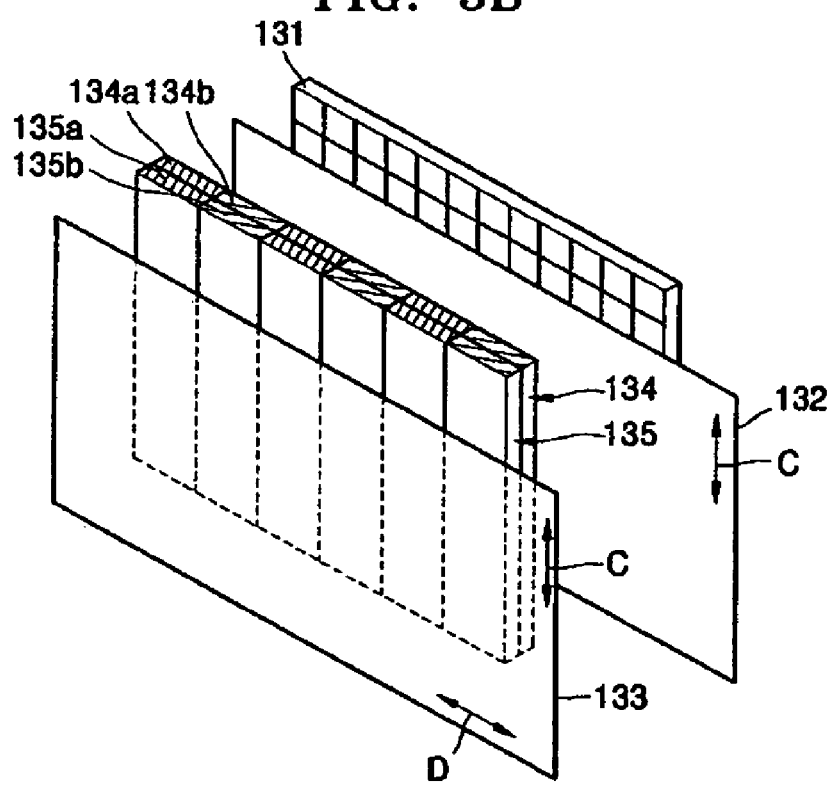

FIGS. 5A and 5B are perspective views illustrating an autostereoscopic display, respectively in the 3D mode and the 2D mode according to another embodiment of the present general inventive concept in which polarization directions C of a polarizer 132 and an analyzer 133 are parallel to each other. That is, the polarization directions C of the polarizer 132 and the analyzer 133 are parallel to a vertical direction of a display device 131. A first plane array 134 includes first and second birefringent elements 134a and 134b each having a stripe shape with a predetermined width, and the first and second birefringent elements 134a and 134b alternating with each other. The first birefringent elements 134a may be rotators rotate incident light by −45°, or retarders to phase-shift the incident light by −λ/4. The second birefringent elements 134b may be rotators to rotate the incident light by +45°, or retarders to phase-shift the incident light by +λ/4.

A second plane array 135 includes third and fourth birefringent elements 135a and 135b each having a striped shape with a predetermined width, and the third and fourth birefringent elements alternating with each other. The third birefringent elements 135a may be rotators to rotate the incident light by +45° or retarders to phase-shift the incident light by +λ/4. The fourth birefringent elements 135b may be rotators to rotate the incident light by −45°, or retarders to phase-shift the incident light by −λ/4. Embodiments in which the first, second, third, and fourth birefringent elements 134a, 134b, 135a, and 135b are ±45° rotators are described below.

Referring to FIG. 5A, when the autostereoscopic display is in the 3D mode, light emitted from the display device 131 is polarized in the vertical direction C by the polarizer 132. Part of the light polarized in the vertical direction C is transmitted through the first birefringent elements 134a and the third birefringent elements 135a, or transmitted through the second birefringent elements 134b and the fourth birefringent elements 135b. Since the vertically polarized light is rotated by −45° by the first and fourth birefringent elements 134a and 135b and by +45° by the second and third birefringent elements 134b and 135a, the polarization of the light is offset such that the light is incident on the analyzer 133 without any change in the polarization thereof. Accordingly, the light is transmitted through the analyzer 133.

Another part of the light polarized in the vertical direction C is transmitted through the first birefringent elements 134a and the fourth birefringent elements 135b, or transmitted through the second birefringent elements 134b and the third birefringent elements 135a. Since the light is rotated by −45° respectively by each of the first and fourth birefringent elements 134a and 135b or +45° by each of the second and third birefringent elements 134b and 135a, the light is rotated by a total of −90° or +90°. As a result, the polarization direction of the light is made perpendicular to the polarization direction C of the analyzer 133, and thus is blocked from being transmitted through the analyzer 133 in the 3D mode.

Although the first, second, third, and fourth birefringent elements 134a, 134b, 135a, and 135b are described above as being rotators to rotate the incident light by ±45°, the first second, third, and fourth birefringent elements 134a, 134b, 135a, and 135b may be retarders to phase-shift the incident light by ±λ/4.

As described above, by shifting the first and second plane arrays 134 and 135 by a distance S, the incident light is transmitted through portions W3 while being blocked from transmission through portions W4. In this case, the portions W4 function as a parallax barrier. Lengths of the portions W3 and W4 can be controlled by the distance S between the first and second plane arrays 134 and 135, and can be determined by considering a loss of light and crosstalk between left-eye images and right-eye images.

Referring to FIG. 5B, the first and second plane arrays 134 and 135 are aligned with each other to realize the full resolution 2D mode. Light emitted from the display device 131 is polarized by the polarizer 132 in the vertical polarization direction C. Part of the vertically polarized light is rotated by −45° by the first birefringent elements 134a and is transmitted through the third birefringent elements 135a to be rotated by +45°, such that the polarization of the light is offset and thus the light is made to have the same polarization direction as that of the analyzer 133 (i.e., vertical). The other part of the vertically polarized light is rotated by +45° by the second birefringent elements 134b and rotated by −45° by the fourth birefringent elements 135b, such that the polarization of the other part of the light is offset and thus the light has the same polarization direction as that of the analyzer 133 (i.e., vertical) in the 2D mode. Accordingly, all light incident on the analyzer 133 is transmitted through the analyzer 133 in the 2D mode.

Figure 6A:
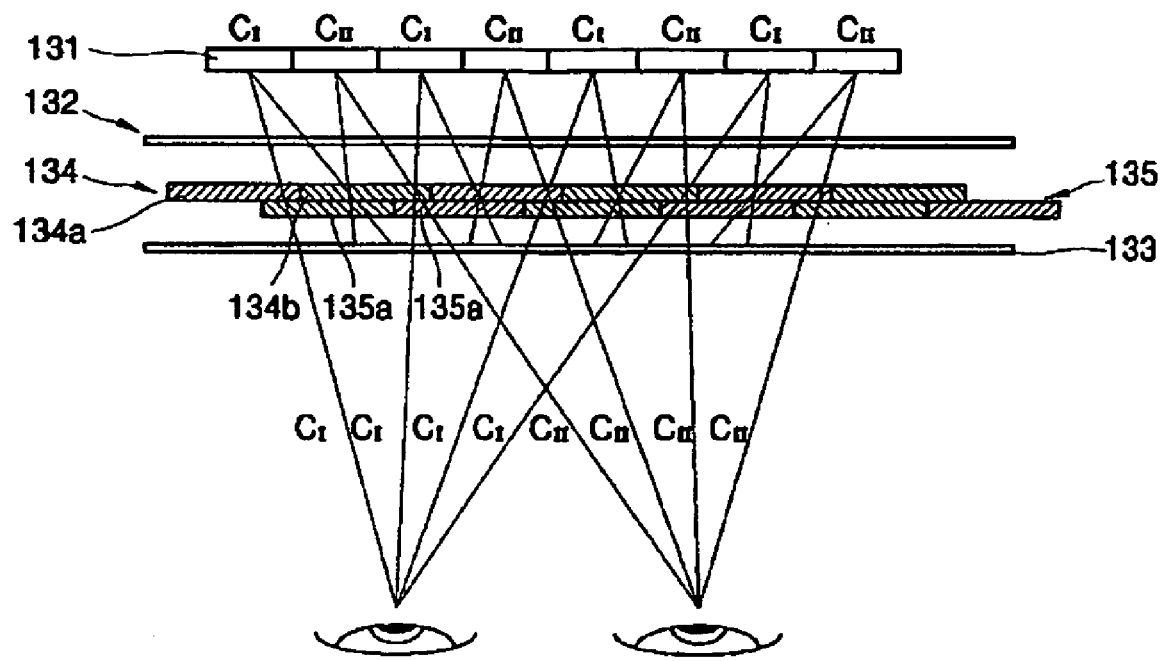
FIGS. 6A and 6B are cross-sectional views illustrating an optical arrangement of the autostereoscopic display of FIGS. 5A and 5B and a liquid crystal display (LCD), respectively in the 3D mode and the 2D mode.
Figure 6B:
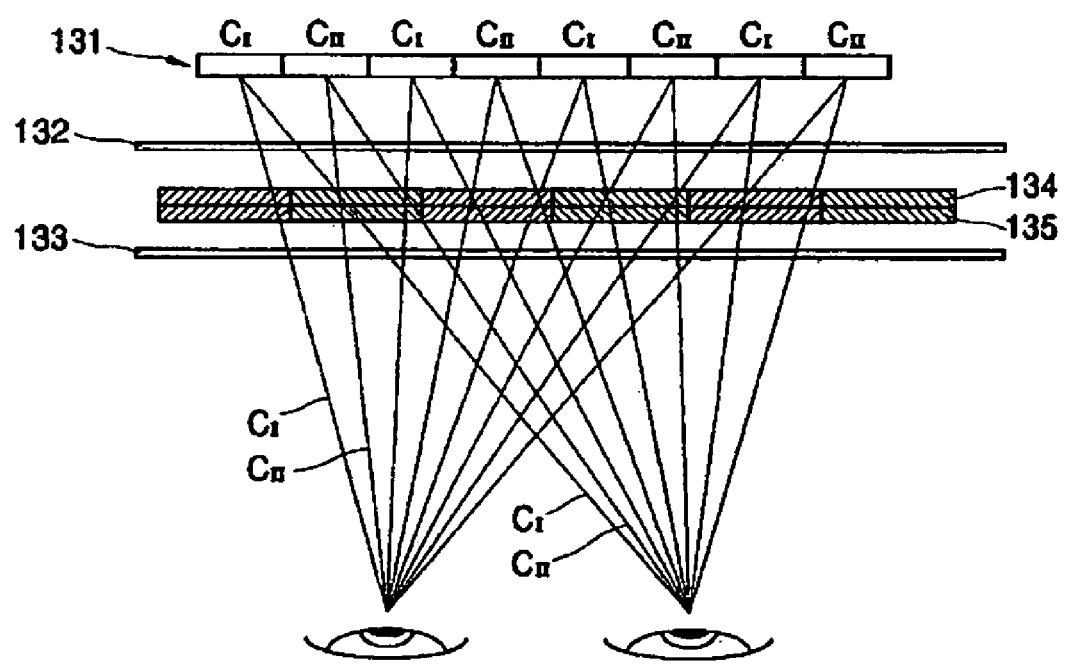

FIGS. 6A and 6B are cross-sectional views illustrating an optical arrangement of the autostereoscopic display of FIGS. 5A and 5B respectively in the 3D mode and the 2D mode according to an embodiment of the general inventive concept.

Referring to FIG. 6A, pixels of the display device 131 are partitioned into two groups of columns CI and CII to display a stereoscopic image. Accordingly, in the 3D mode, a left-eye image may be displayed using the columns CI, and a right-eye image is displayed using the columns CII. The first and second plane arrays 134 and 135 include birefringent elements, which may be ±45° rotators or ±λ/4 retarders. In the 3D mode illustrated in FIG. 6A, the boundaries between the birefringent elements of the first plane array 134 and the birefringent elements of the second plane array 135 are misaligned. In the 2D mode illustrated in FIG. 6B, the boundaries are aligned with each other. Accordingly, in the 3D mode, light passing through the first and third birefringent elements 134a and 135a and light passing through the second and fourth birefringent elements 134b and 135b is transmitted through the analyzer 133 to reach a viewer's eyes. On the other hand, since polarization directions of light passing through the first and fourth birefringent elements 134a and 135b and light passing through the second and third birefringent elements 134b and 135a are perpendicular to the polarization direction of the analyzer 133, the light that passes through the first and second plane arrays 134 and 135 cannot be transmitted through the analyzer 133. Accordingly, the polarizer 132, the first and second plane arrays 134 and 135, and the analyzer 133 can function as a parallax barrier unit in the autostereoscopic display.

Accordingly, among left-eye images provided by the columns CI of the display device 131, images directed toward the viewer's right eye are blocked by the analyzer 133 and images provided by the columns CI that are directed toward the viewer's left eye can be transmitted through the analyzer 133. Similarly, among right-eye images provided by the columns CII of the display device 131, images directed toward the viewer's left eye are blocked by the analyzer 133 and images provided by the columns CII that are directed toward the viewer's right eye can be transmitted through the analyzer 134. Accordingly, the viewer can perceive a stereoscopic image.

Referring to FIG. 6B, in the 2D mode, the boundaries between the birefringent elements of the first plane array 134 and the birefringent elements of the second plane array 135 are aligned with each other. That is, the first and third birefringent elements 134a and 135a face each other, and the second and fourth birefringent elements 134b and 135b face each other. In this case, the polarization of the incident light rotated by the first and third birefringent elements 134a and 135a is offset, and the polarization of the incident light rotated by the second and fourth birefringent elements 134b and 135b is compensated, thereby disabling the parallax barrier. As a result, polarization directions of images provided from entire regions of the display device 131 are the same as the polarization direction of the analyzer 133, and images displayed by all pixels of the display device 131 are separately provided to the viewer's left and right eyes.

In the present embodiment, the display device 131 may be a plasma display panel (PDP) to emit non-polarized light or a liquid crystal display (LCD) to emit polarized light. When the PDP is used as the display device 131, the polarizer 132 may be used to polarize the non-polarized light. On the other hand, when the LCD is used as the display device 131, the polarizer 132 is unnecessary, since the LCD emits the polarized light.

Figure 7A:
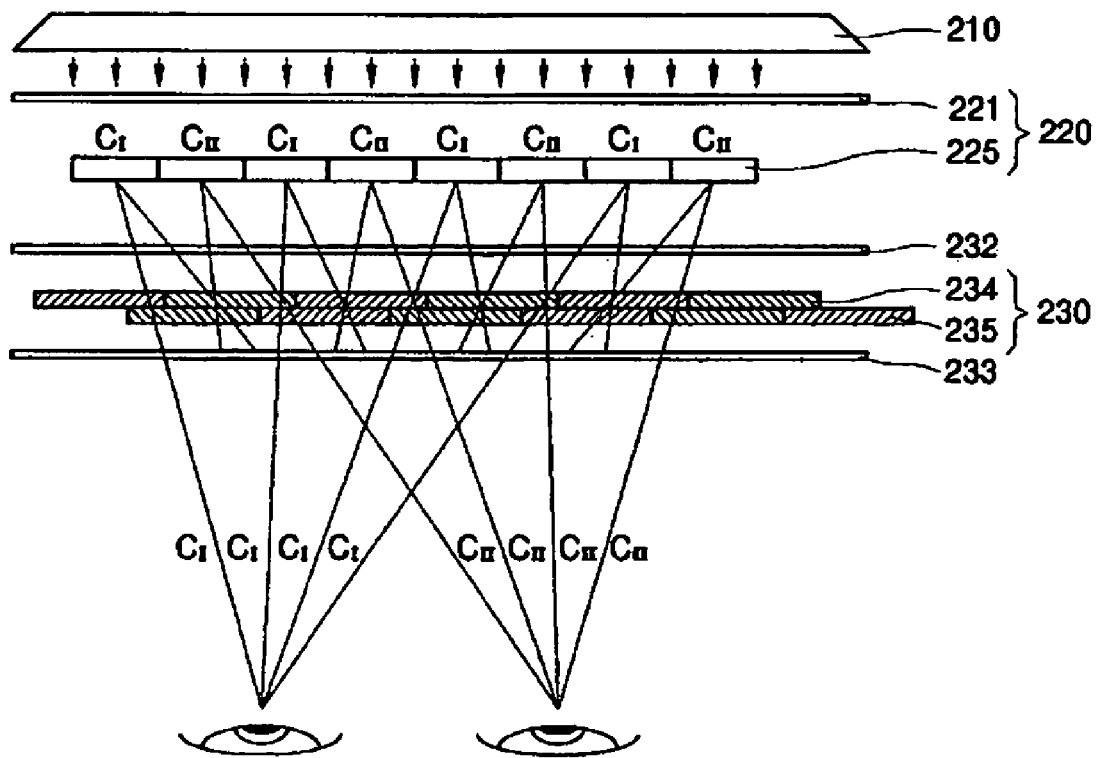
FIGS. 7A and 7B are cross-sectional views illustrating an optical arrangement of the autostereoscopic display of FIGS. 3A and 3B and an LCD, respectively in the 3D mode and the 2D mode.
Figure 7B:
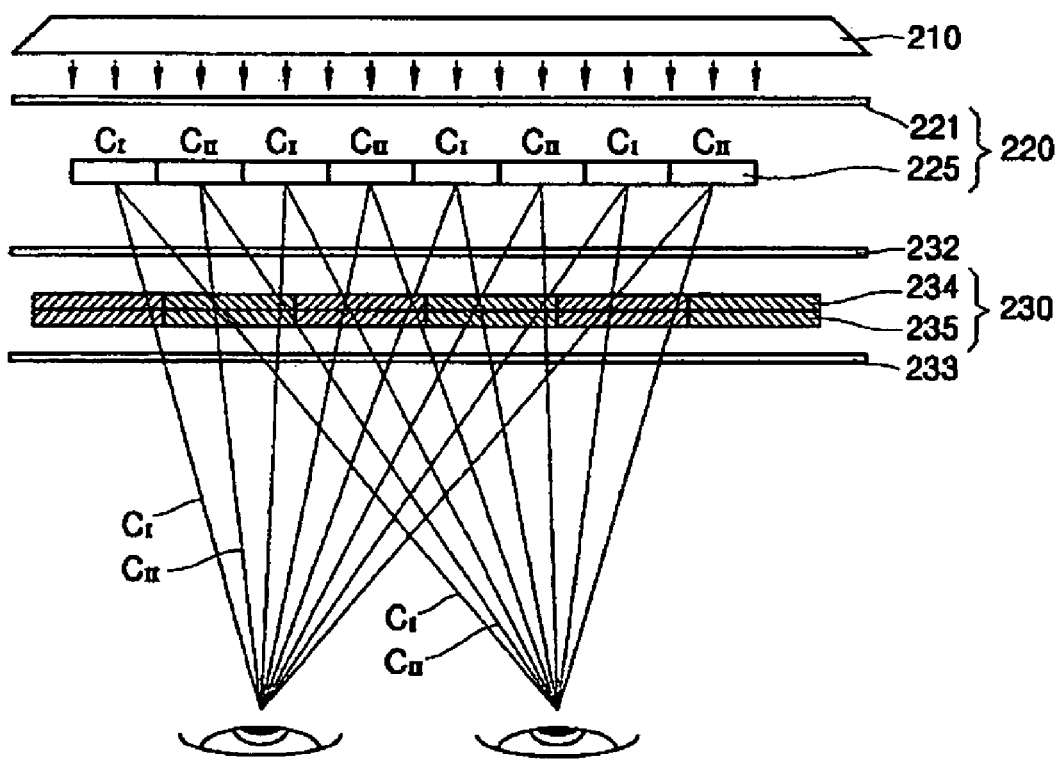

FIGS. 7A and 7B are cross-sectional views illustrating an optical arrangement of the autostereoscopic display of FIGS. 3A and 3B, respectively in the 3D mode and the 2D mode according to an embodiment of the present general inventive concept.

Referring to FIGS. 7A and 7B, a display device includes a backlight unit 210 disposed behind a parallax barrier unit 230 that selectively forms a barrier, and a display unit 220. The display unit 220 includes a rear polarizer 221, an LCD panel 225, and a front polarizer. The display unit 220 forms an image by selectively driving a plurality of pixels that are arranged in two dimensions to illuminate an image using the backlight unit 210 to provide a stereoscopic image.

The parallax barrier unit 230, as illustrated in FIGS. 3A through 3F, selectively transmits the incident light, and includes a polarizer 232, first and second plane arrays 234 and 235, and an analyzer 233. The polarizer 232 of the parallax barrier unit 230 may be used as the front polarizer of the display unit 220. Accordingly, the front polarizer can be omitted in configuring the display unit 220.

Figure 8A:
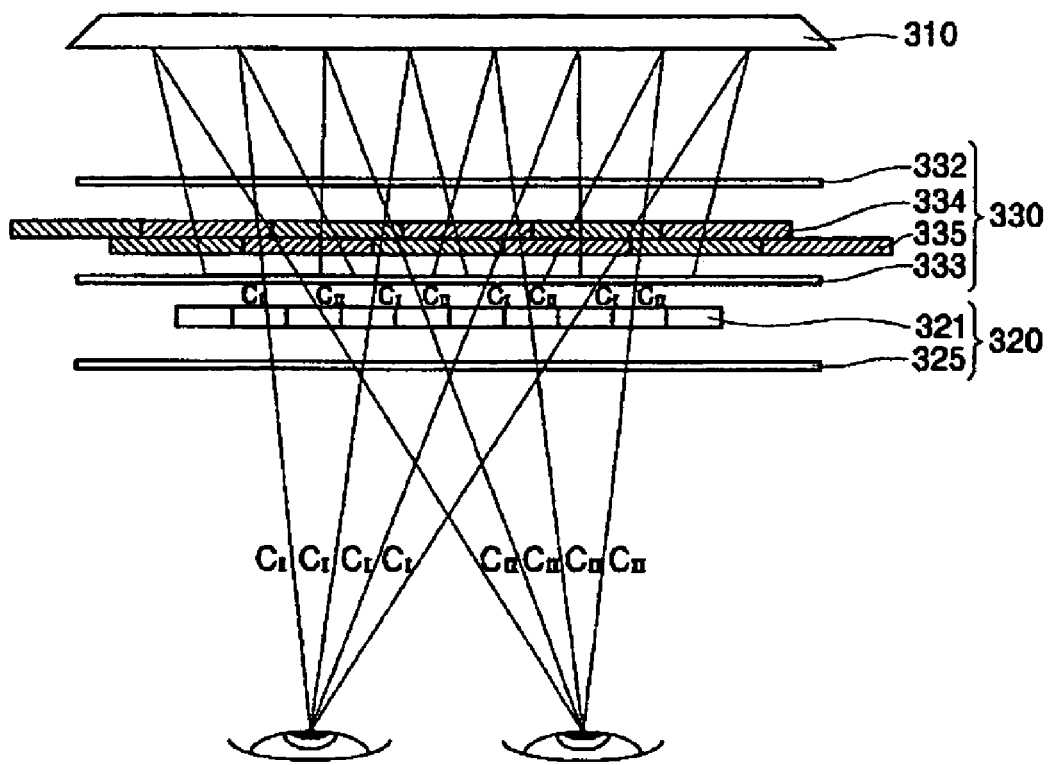
FIGS. 8A and 8B are cross-sectional views illustrating another optical arrangement of the autostereoscopic display of FIGS. 3A and 3B and an LCD, respectively in the 3D mode and the 2D mode.
Figure 8B:
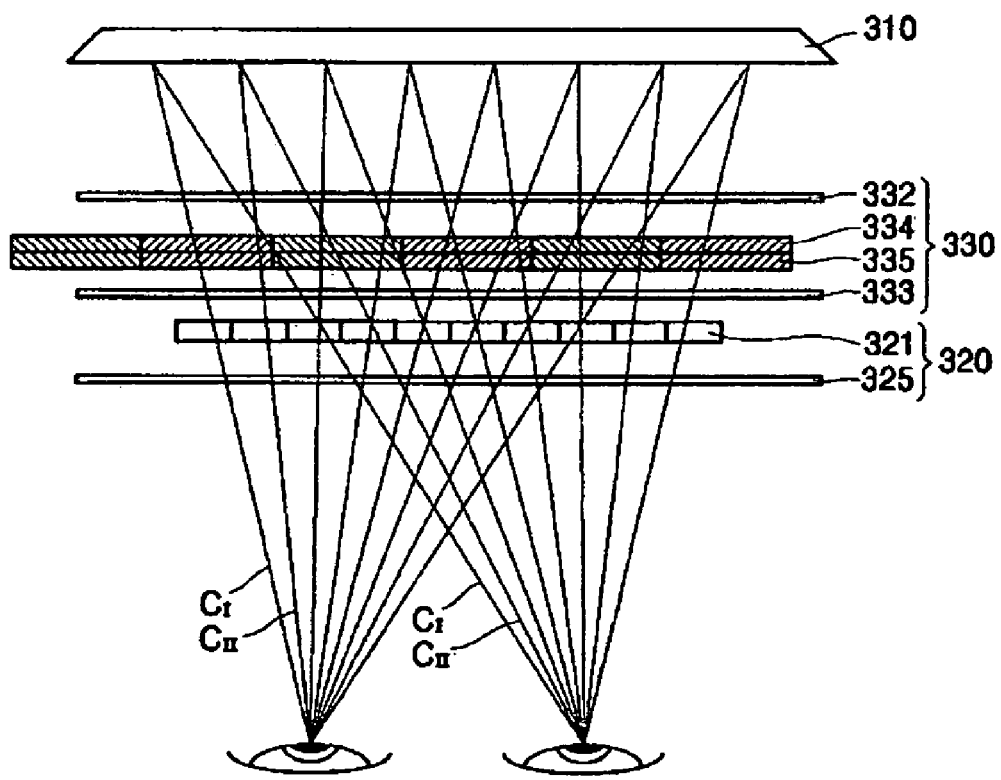

FIGS. 8A and 8B are cross-sectional views illustrating another optical arrangement of the autostereoscopic display of FIGS. 3A and 3B and an LCD, respectively in the 3D mode and the 2D mode according to another embodiment of the present general inventive concept.

Referring to FIGS. 8A and 8B, a backlight unit 310 is disposed behind a parallax barrier unit 330 that selectively forms a barrier, and a display unit 320 is disposed in front of the parallax barrier unit 330.

The parallax barrier unit 330 illustrated in FIGS. 3A through 3F selectively transmits the incident light, and includes a polarizer 332, first and second plane arrays 334 and 335, and an analyzer 333.

The display unit 320 includes a rear polarizer, an LCD panel 321, and a front polarizer 325. The display unit 320 forms an image by selectively driving a plurality of pixels that are arranged in two dimensions to illuminate the formed image using the backlight unit 310 to provide a stereoscopic image.

The analyzer 333 of the parallax barrier unit 330 may be used as the rear polarizer of the display unit 320. Accordingly, the rear polarizer may be omitted in configuring the display unit 320.

Figure 9A:
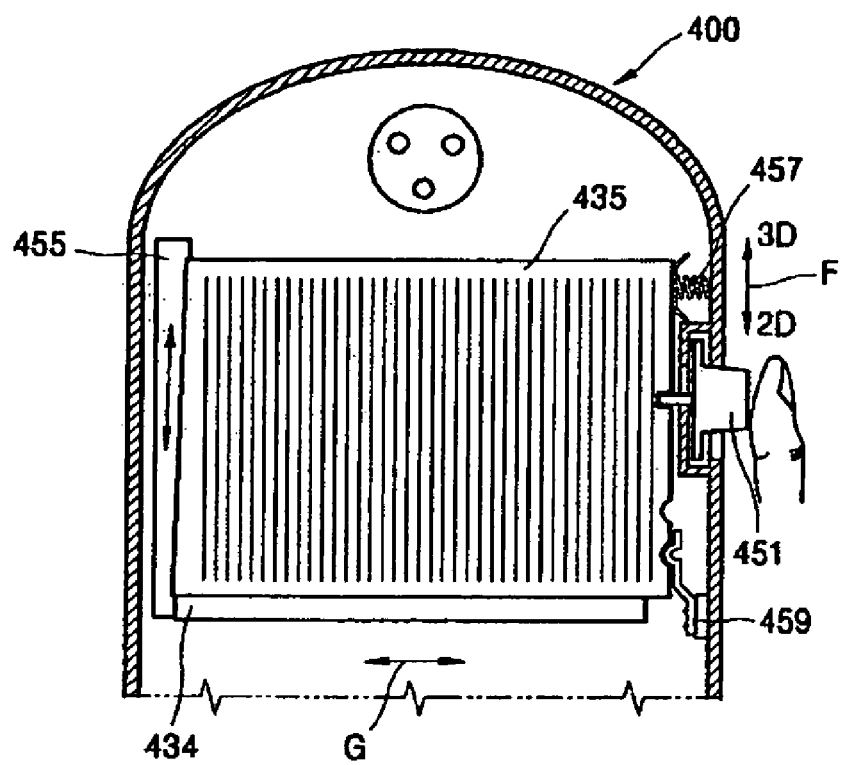
FIG. 9A illustrates a mechanism to manually control a first plane array and a second plane array using a 2D/3D switch according to an embodiment of the present general inventive concept.
Figure 9B:
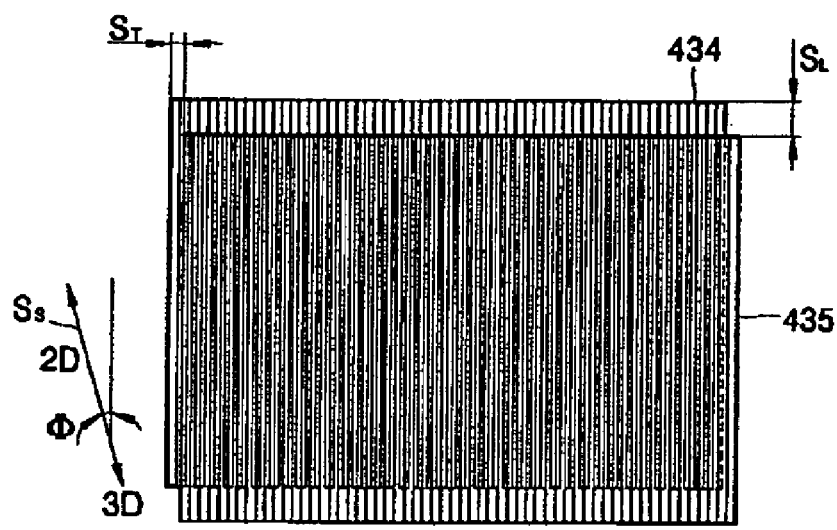
FIG. 9B illustrates an amount by which the second plane array is shifted by the 2D/3D switch of FIG. 9A.

FIGS. 9A and 9B illustrate a mechanism to manually control relative positioning of first and second plane arrays 434 and 435 using a 2D/3D switch.

FIG. 9A illustrates the control mechanism moving the second plane array 435 relative to the first plane array 434 by manually controlling the 2D/3D switch. FIG. 9B illustrates an amount by which the second plane array 435 is shifted obliquely.

The first plane array 434 and the second plane array 435 having substantially the same shape and/or size may be relatively shifted by an electromechanical or piezoelectric actuator. Other shifting mechanisms may also be used to perform the relative shifting.

In simple, portable, or low cost displays, the relative shifting of the first and second plane arrays 434 and 435 can be conducted manually.

An effective displacement of the second plane array 435 may be as small as possible while an operational travel distance of a knob 451 used to manually displace the second plane array 435 may be as large as possible. When an angle between an operational direction of the knob 451 and an inclination direction has an inclination angle $\Phi$, a transversal shift of the second plane array 435 is $S_T$, and a movement in the inclination direction is $S_S$, $S_S=S_T/\sin \Phi$. For example, when $S_T=0.1$ mm and $\Phi=1.5°$, the movement in the inclination direction $S_S=0.1/0.026=3.8$ mm. Accordingly, when 3.8 mm is shifted manually, the transversal shift of the second plane array 435 is 0.1 mm(=100 um), which can be easily done manually.

FIG. 9A illustrates a manually controllable switchable parallax barrier installed in a body of a mobile phone 400 according to an embodiment of the present general inventive concept. It should be understood that the manually controllable switchable parallax barrier may be used in other devices as well. Referring to FIG. 9A, the first plane array 434 is fixed while the second plane array 435 is movable. That is, the second plane array 435 can be shifted in a vertical direction indicated by arrow F and/or a horizontal direction indicated by arrow G by moving the knob 451 in the vertical direction F. An inclination guide 455 is installed on a side of the second plane array 435, and an elastic member 457 and a latch 459 are disposed on the other side of the second plane array 435. The elastic member 457 elastically biases the second plane array 435 toward the inclination guide 455, and the latch 459 is formed to latch the movable second plane array 435 at appropriate positions for respective 2D and 3D modes. When the amount by which the knob 451 is moved in the direction F is $S_L$, the inclination angle is $\Phi$, and the transversal shift is $S_T$, $S_L=S_T/\tan \Phi$. For example, when $S_T=0.1$ mm and $\Phi=1.5°$, $S_L=0.1/0.026=3.8$ mm. When 3.8 mm is shifted manually, the effective transversal shift is 0.1 mm(=100 um) which can easily be done manually.

Since the autostereoscopic display according to the various embodiments of the present general inventive concept can switch between a 2D mode and a 3D mode by shifting polarization rotators or polarization retarders, the mode switch can be conducted within a small space.

When plane arrays are manually shifted by approximately 100 um to switch modes, a real operational travel distance of a knob can be increased due to inclination movement of the plane arrays, thereby making it easy to control the autostereoscopic display using the knob. Additionally, the 2D and 3D modes can easily be switched by driving the plane arrays, which selectively form a parallax barrier, using an electromechanical or piezoelectric actuator.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An autostereoscopic display, comprising:
    a display device to display an image; and
    a parallax barrier unit to transmit all incident light in a 2D mode, and to separate the incident light into a left-eye image and a right-eye image by forming a barrier in a 3D mode, the parallax barrier unit comprising:
        a polarizer disposed in an optical path of the image displayed by the display device to transmit light having a predetermined polarizer polarization direction,
        a first plane array including first birefringent elements, which change a polarization direction of light transmitted through the polarizer into a first direction, and second birefringent elements, which change the polarization direction of light transmitted through the polarizer into a second direction opposite to the first direction, the first and second birefringent elements alternating with each other,
        a second plane array facing the first plane array, and including third birefringent elements, which change a polarization direction of light transmitted through the first plane array into a third direction, and fourth birefringent elements, which change the polarization direction of light transmitted through the first plane array into a fourth direction opposite to the third direction, the third and fourth birefringent elements alternating with each other, and
        an analyzer facing the second plane array to transmit only light having a predetermined analyzer polarization direction from among light transmitted through the second plane array,
    wherein at least one of the first and second plane arrays is movable to control relative positions of the first and second birefringent elements and the third and fourth birefringent elements to selectively display a 2D image or a 3D image.

2. The autostereoscopic display of claim 1, wherein the first birefringent elements and the second birefringent elements comprise rotators to rotate incident light by $+(2n+1)\times 45°$ and $-(2n+1)\times 45°$, respectively, where $n=0, 1, 2, 3, \ldots$ 3. The autostereoscopic display of claim 1, wherein the first birefringent elements and the second birefringent elements comprise retarders to phase-shift incident light by $+(2n+1)\lambda/4$ and $-(2n+1)\lambda/4$, respectively, where $\lambda$ denotes a wavelength of incident light and $n=0, 1, 2, 3, \ldots$ 4. The autostereoscopic display of claim 1, wherein the third birefringent elements and the fourth birefringent elements comprise rotators to rotate incident light by $+(2n+1)\times 45°$ and $-(2n+1)\times 45°$, respectively, where $n=0, 1, 2, 3, \ldots$ 5. The autostereoscopic display of claim 1, wherein the third birefringent elements and the fourth birefringent elements comprise retarders to phase-shift incident light by $+(2n+1)\lambda/4$ and $-(2n+1)\lambda/4$, where A denotes a wavelength of incident light and $n=0, 1, 2, 3, \ldots$ 6. The autostereoscopic display of claim 1, wherein the predetermined polarizer polarization direction and the predetermined analyzer polarization direction are parallel or perpendicular to each other.

7. The autostereoscopic display of claim 1, wherein the first, second, third, and fourth birefringent elements are arranged as strips elongated in a direction that is parallel to the predetermined polarizer polarization direction.

8. The autostereoscopic display of claim 7, wherein the first and second plane arrays are relatively shifted in a direction slanted at a first inclination angle with respect to the direction in which the first second, third, and fourth birefringent elements are arranged.

9. The autostereoscopic display of claim 1, wherein the first, second, third, and fourth birefringent elements are arranged as stripes elongated in a direction that is slanted at a second inclination angle with respect to the predetermined polarizer polarization direction.

10. The autostereoscopic display of claim 9, wherein the first and second plane arrays are relatively shifted in a direction that is slanted at a third inclination angle, which is different from the second inclination angle, with respect to the predetermined polarizer polarization direction.

11. The autostereoscopic display of claim 1, wherein each of the first, second, third, and fourth birefringent elements are arranged in a stepwise manner and include a plurality of two dimensional birefringent elements.

12. The autostereoscopic display of claim 1, wherein a relative shift of the first and second plane arrays is provided manually.

13. The autostereoscopic display of claim 1, wherein a relative shift of the first and second plane arrays is provided by an electromechanical or piezoelectric actuator.

14. The autostereoscopic display of claim 1, wherein the display device includes a plurality of two dimensional pixels each of which emits light independently.

15. The autostereoscopic display of claim 14, wherein the display device comprises a plasma display panel.

16. The autostereoscopic display of claim 1, wherein: the display device comprises:
a backlight unit to emit light,
a rear polarizer to transmit only light having a predetermined rear polarizer polarization direction from among the light emitted by the backlight unit, and
a liquid crystal display panel to convert a polarization of incident light into a predetermined LCD polarization for each pixel and to display the image; and
the parallax barrier unit is disposed between the liquid crystal display panel and a viewer, such that the polarizer of the parallax barrier unit is used as a front polarizer of the display device.

17. The autostereoscopic display of claim 1, wherein:
the display device comprises:
a backlight unit to emit light,
a liquid crystal display panel to convert a polarization of incident light into a predetermined LCD polarization for each pixel and to display the image, and
a front polarizer to transmit only light having a predetermined front polarizer polarization direction from among light transmitted through the liquid crystal display panel; and
the parallax barrier unit is disposed between the backlight unit and the liquid crystal display panel, such that the analyzer of the parallax barrier unit is used as a rear polarizer of the display device.

18. An autostereoscopic display, comprising:
a first plane array to receive first incident light of an image and having a plurality of first and second birefringent elements to change a polarization of the first incident light in first and second directions;
a second plane array disposed adjacent to the first plane array to receive second incident light from the first plane array and having a plurality of third and fourth birefringent elements to change a polarization of the second incident light in the first and second directions;
an analyzer to receive third incident light from the second plane array and to transmit the third incident light of a predetermined polarization; and
a switch to shift a relative position of the first and second plane arrays such that a first portion of the first incident light of the image is blocked by the analyzer while a second portion of the first incident light of the image is transmitted by the analyzer when the autostereoscopic display operates in a 3D mode,
wherein the first, second, third, and fourth birefringent elements each comprise one of a positive linear phase shift element, a negative linear phase shift element, a positive rotational element, and a negative rotational element.

19. The display of claim 18, wherein the first plane array faces the second plane array such that the switch shifts the relative position of the first and second plane arrays by a predetermined distance such that edges of the plurality of first and second birefringent elements are not aligned with edges of the plurality of third and fourth birefringent elements when operating in the 3D mode, and the switch aligns the edges of the plurality of first and second birefringent elements with edges of the plurality of third and fourth birefringent elements when operating in a 2D mode.

20. The display of claim 18, wherein the analyzer has a predetermined analyzer polarization direction such that the switch controls the first and second plane arrays to transmit all light having the predetermined analyzer polarization direction in a 2D mode and to transmit a first part of the light having the predetermined analyzer polarization direction and a second part of the light not having the predetermined analyzer polarization direction.

21. The display of claim 18, wherein the switch provides a barrier portion by arranging the first and fourth birefringent elements adjacent to each other and arranging the second and third birefringent elements adjacent to each other, and provides a transmission portion by arranging the first and third birefringent elements adjacent to each other and arranging the second and fourth birefringent elements adjacent to each other.

22. The display of claim 18, further comprising:
a linear polarizer disposed adjacent to the first plane array to receive the first incident light of the image, to polarize the first incident light to have a vertical polarization direction, and to provide the vertically polarized light to the first plane array.

23. The display of claim 18, wherein the first, second, third, and fourth birefringent elements rotate or shift the polarization of the first and second incident light by forty-five degrees or a quarter wavelength.

24. The display of claim 18, further comprising:
a display device having a plurality of pixels arranged in a row and column matrix such that a first group of the plurality of pixels are operated to form a left eye image and a second group of the plurality of pixels are operated to form a right eye image.

25. The display of claim 24, wherein the switch operates to control the first, second, third, and fourth birefringent elements to block the left eye image from reaching a right eye of a viewer and to block the right eye image from reaching a left eye of the viewer in the 3D mode.

26. The display of claim 18, wherein the switch comprises a knob to be rotated by a viewer such that the second plane array is relatively shifted along a movement direction with respect to the first plane array.

27. The display of claim 26, wherein the switch further comprises an inclination guide along which the second plane array is movable by the knob, and the movement direction is inclined with respect to a vertical direction according to the following equation:

$$S_s = S_T / \sin \Phi$$

where $S_S$ represents movement along the movement direction, $S_T$ represents transversal movement of the second plane array along a horizontal direction, and $\Phi$ represents an inclination angle of the movement direction with respect to the vertical direction.

28. The display of claim 18, wherein the first plane array has a rectangular shape including the first and second birefringent elements arranged as alternating strips extending along a vertical direction, and the second plane array has a rectangular shape including the third and fourth birefringent elements arranged as alternating strips extending along the vertical direction.

29. A method of switching between a 3D mode and a 2D mode in an autostereoscopic display, the method comprising:
receiving polarized light of an image; and
controlling a relative positioning of two birefringent arrays such that all the received light passes through the two birefringent arrays to have a polarization transformed to a predetermined output polarization in a first operational mode, and a first portion of all the received light passes through the two birefringent arrays to have a polarization transformed to a predetermined blocked polarization and a second portion of all the received light passes through the two birefringent arrays to have a polarization transformed to the predetermined output polarization in a second operational mode.

30. The method of claim 29, further comprising:
outputting the light having the predetermined output polarization.

31. A parallax barrier unit, comprising:
a polarizer to transmit light having a predetermined polarizer polarization direction,
a plurality of plane arrays comprising a plurality of birefringent elements, which each change a polarization direction of light transmitted through the polarizer into a plurality of directions; and
an analyzer facing to transmit only light having a predetermined analyzer polarization direction from among light transmitted through the plurality of plane arrays.

* * * * *